(12) United States Patent
Van Bommel et al.

(10) Patent No.: US 11,015,765 B2
(45) Date of Patent: May 25, 2021

(54) LIGHTING DEVICE AND A LUMINAIRE

(71) Applicant: SIGNIFY HOLDING B.V., Eindhoven (NL)

(72) Inventors: Ties Van Bommel, Horst (NL); Rifat Ata Mustafa Hikmet, Eindhoven (NL); Alexander Henricus Waltherus Van Eeuwijk, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/610,378

(22) PCT Filed: Apr. 30, 2018

(86) PCT No.: PCT/EP2018/061039
§ 371 (c)(1),
(2) Date: Nov. 1, 2019

(87) PCT Pub. No.: WO2018/202625
PCT Pub. Date: Nov. 8, 2018

(65) Prior Publication Data
US 2020/0141541 A1 May 7, 2020

(30) Foreign Application Priority Data

May 2, 2017 (EP) ..................... 17168998

(51) Int. Cl.
*F21K 9/232* (2016.01)
*F21K 9/61* (2016.01)
(Continued)

(52) U.S. Cl.
CPC ............... *F21K 9/232* (2016.08); *F21K 9/61* (2016.08); *G02B 6/001* (2013.01); *F21Y 2115/10* (2016.08)

(58) Field of Classification Search
None
See application file for complete search history.

(56) References Cited

U.S. PATENT DOCUMENTS

| 8,240,900 B2 | 8/2012 | Van Rijswick et al. |
| 8,292,471 B2 | 10/2012 | Boonekamp et al. |

(Continued)

FOREIGN PATENT DOCUMENTS

| CN | 204254304 U | 4/2015 |
| GB | 2539190 A | 12/2016 |

(Continued)

*Primary Examiner* — Britt D Hanley
(74) *Attorney, Agent, or Firm* — Daniel J. Piotrowski

(57) ABSTRACT

A lighting device (100) for use in a luminaire (200) comprising: —a base (101) having a longitudinal axis (LA) and comprising an electrical connector (102) for connecting the lighting device (100) to a luminaire socket (201) of the luminaire (200), —at least one LED-filament (103) comprising a substrate (104) having an elongated body and a plurality of light sources (105) mechanically coupled to the substrate (104), the plurality of light sources (105) configured for emitting light (106) in a first spatial light distribution, —at least one light guide (107) having an elongated body, comprising at least one light in-coupling portion (108) at at least on the external periphery of the at least one light guide (107) for coupling light (106) into the at least one light guide (107), a plurality of light out-coupling portions (109) for coupling light (106) out of the at least one light guide (107) in a second spatial light distribution, —an at least in part light-transmissive envelope (110) at least partly encapsulating said at least one LED-filament (103) and said at least one light guide (107), —wherein the at least one light guide (107) is arranged for guiding the light (106) coupled into the at least one light guide (107) at the at least one light in-coupling portion (108) via total internal reflection (111) to the plurality of light out-coupling portions (109), —wherein (Continued)

the at least one LED-filament (103) is external to the at least one light guide (107).

16 Claims, 10 Drawing Sheets

(51) Int. Cl.
*F21V 8/00* (2006.01)
*F21Y 115/10* (2016.01)

(56) References Cited

U.S. PATENT DOCUMENTS

| | | | |
|---|---|---|---|
| 8,750,671 B1 * | 6/2014 | Kelly | F21V 3/049 |
| | | | 385/146 |
| 8,890,401 B2 * | 11/2014 | Bailey | F21K 9/61 |
| | | | 313/501 |
| 2012/0217862 A1 | 8/2012 | Matsuda et al. | |
| 2014/0268802 A1 * | 9/2014 | Sun | F21V 5/04 |
| | | | 362/294 |
| 2016/0116120 A1 | 4/2016 | Kwisthout | |
| 2016/0369952 A1 | 12/2016 | Weekamp | |

FOREIGN PATENT DOCUMENTS

| | | |
|---|---|---|
| WO | 2015096280 A1 | 7/2015 |
| WO | 2016005069 A1 | 1/2016 |

* cited by examiner

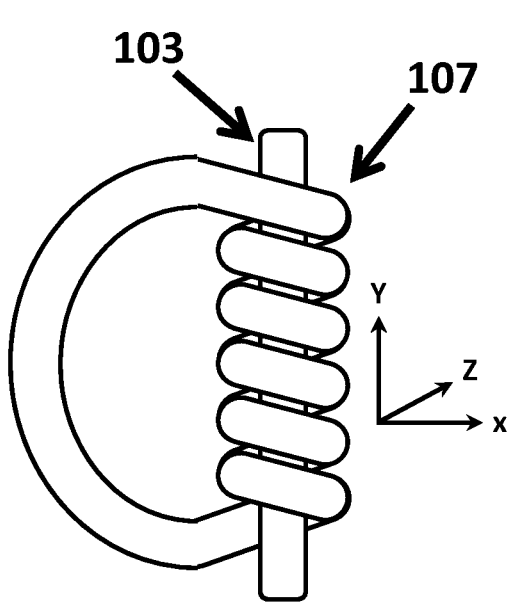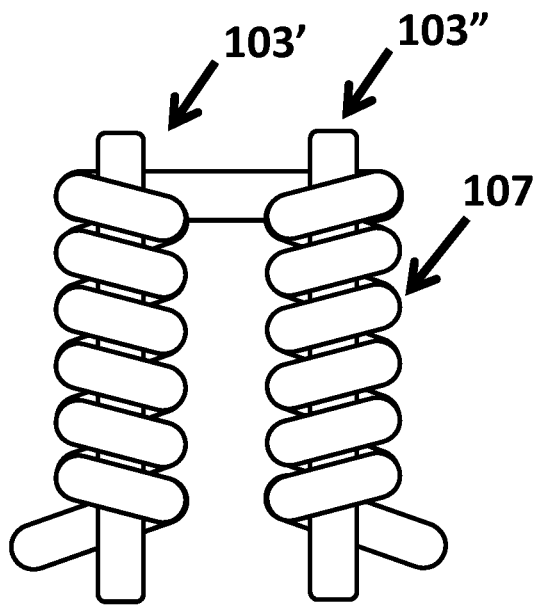
Fig. 9A Fig. 9B
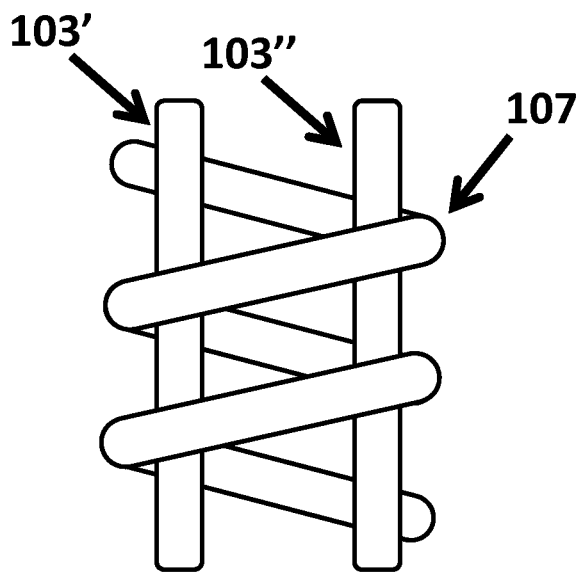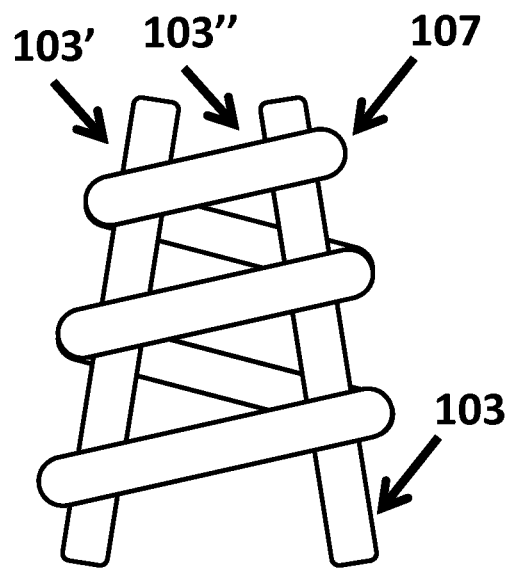
Fig. 9C Fig. 9D

LIGHTING DEVICE AND A LUMINAIRE

CROSS-REFERENCE TO PRIOR APPLICATIONS

This application is the U.S. National Phase application under 35 U.S.C. § 371 of International Application No. PCT/EP2018/061039, filed on Apr. 30, 2018, which claims the benefit of European Patent Application No. 17168998.7, filed on May 2, 2017. These applications are hereby incorporated by reference herein.

FIELD OF THE INVENTION

The present invention relates to a lighting device for use in a luminaire, and to a luminaire comprising said lighting device.

BACKGROUND OF THE INVENTION

Incandescent lamps are rapidly being replaced by LED based lighting solutions. It is nevertheless appreciated and desired by users to have retrofit lamps which have the look of an incandescent bulb. For this purpose, one can simply make use of the infrastructure for producing incandescent lamps based on glass and replace the filament with LEDs emitting white light. One of the concepts is based on LED-filaments placed in such a bulb. The appearances of these lamps are highly appreciated as they look highly decorative.

One such LED based solution is known from U.S. 2012/0217862 A1, describing a light bulb type lamp comprising a LED module having a translucent board in the shape of a plate and a plurality of LEDs mounted on the board such as to form two lines of LEDs. The LED module further comprises a sealing component for sealing the LEDs such that the lines of LEDs, when in operation, give the impression of a filament. The LED module further comprises lines, wiring and power supply for the LEDs.

However, for such known solutions, at high intensity of the LED-filament the result is too much glare in the output of the lamp.

GB 2539190 A discloses an LED light bulb which contains an LED, LED filaments, a base, a driving circuit, and a light guiding element. The base includes a hollow cavity for accommodating the driving circuit and LED. The base has an electrical fitting and a bulb holder. The light guiding element is made of photoconductive material and is coupled with the base, and includes a light entry end adjacent to the LED to guide light from the LED. The LED filaments surround the light guiding element, and are supported by the light guiding element.

SUMMARY OF THE INVENTION

It is an object of the present invention to provide a light emitting device that produces less glare.

The present invention discloses a lighting device in accordance with the independent claim 1. Preferred embodiments are defined by the dependent claims.

According to a first aspect of the invention, a lighting device for use in a luminaire is provided which comprises a base, at least one LED-filament, at least one light guide, and an at least in part light-transmissive envelope. The base has a longitudinal axis and comprises an electrical connector which connects the lighting device to a luminaire socket of the luminaire. The at least one LED-filament comprises a substrate which has an elongated body. The at least one LED-filament has plurality of light sources which are mechanically coupled to the substrate. The plurality of light sources emits light in a first spatial light distribution. The at least one light guide has an elongated body. The at least one light guide comprises at least one light in-coupling portion at at least on the external periphery of the at least one light guide. The at least one light in-coupling portion couples light into the at least one light guide. The at least one light guide comprises a plurality of light out-coupling portions which couple light out of the at least one light guide in a second spatial light distribution. The at least in part light-transmissive envelope at least partly encapsulates said at least one LED-filament and said at least one light guide. The at least one light guide guides the light which is coupled into the at least one light guide at the at least one light in-coupling portion via total internal reflection to the plurality of light out-coupling portions. The at least one LED-filament is external to the at least one light guide.

By providing both at least one LED-filament and a at least one light guide wherein the at least one LED-filament is external to the at least one light guide, a light emitting device that produces less glare when the lumen output of the lamp is increased by only increasing the intensity of the at least one LED-filament is increased is provided. The reason is that the at least one light guide increases the light emitting surface in the lamp and thus decreases the brightness of the at least one LED-filament. Decreased brightness of the at least one LED-filament causes less glare. In an embodiment, the provided light emitting device does not produce, or only to a very limited degree produces, glare when the lumen output of the lamp is increased.

The solution proposed in U.S. 2012/0217862 A1 is unable to provide a light emitting device that decreases glare when the lumen output of the lamp is increased and thereby the intensity of the at least one LED-filament would be increased. The reason is that the at least one LED-filament has a small light emitting surface and when the intensity of the at least one LED-filament is increased it does not produce less glare. Thus the solution proposed in U.S. 2012/0217862 A1 does produce glare when the intensity of the at least one LED-filament is increased.

In an embodiment the at least one LED-filament may be physically separated from the at least one light guide. In an embodiment the at least one LED-filament may be positioned at non-zero distance to the at least one light guide. In an embodiment the at least one LED-filament may be mechanically and optically coupled to the at least one light guide. In an embodiment the first spatial light distribution is different from the second spatial light distribution. In an embodiment the first spatial light distribution partly overlaps the second spatial light distribution. For example, the light guide provides a spatial light distribution in 360 degrees, while the LED filament provides spatial light distribution less than 270 degrees such as for example 180 degrees. The obtained effect is less glare. The reason is that more light emitted to different and/or more directions.

In an embodiment the lighting device further comprises a driver circuit which is electrically connected between the electrical connector and the plurality of light sources. The driver converts the electrical output of the luminaire, i.e. the electrical input for the driver, to an electrical output of the driver that is matched to electrical characteristics of the light source. Typically the electrical input of the driver is an alternating current at a high voltage such as the mains voltage which is converted by the driver circuit into a direct current at a low voltage. The obtained effect is the electrical output of the driver is safer of less harmful to touch during connection of the lighting device in a luminaire. The reason is that the typical output of the driver is an direct current at low voltage which is often imperceptible when passing through the body, while the typical output of a luminaire is an alternating current at a high voltage which is unpleasant or dangerous when passing through the body.

In an embodiment, the substrate has an elongated body which has an extension along a first elongation axis. The at least one light guide has an elongated body which has an extension along a second elongation axis. At least a portion of the first elongation axis is non-parallel to at least a portion of the second elongation axis. The obtained effect is the light emitting device produces less glare. The reason is that the first spatial light distribution and the second spatial light distribution may be different. For example, the first spatial light distribution and the second spatial light distribution may not fully overlap. For example, the first spatial light distribution and the second spatial light distribution may overlap but are different such as for example the first spatial light distribution is relatively narrow, while the second spatial light distribution is relatively broad. The obtained effect is also improved decorative lighting. The reason is that the at least one light guide may be positioned at a different angle or at different angles with respect to the at least one LED filament.

In an embodiment, the angle between the first elongation axis and the second elongation axis is in the range from 10 to 80 degrees. The obtained effect is that the light emitting device produces less glare. The reason is that the first spatial light distribution and the second spatial light distribution may be different. For example, the first spatial light distribution and the second spatial light distribution may not fully overlap. The obtained effect is also improved decorative lighting. The reason is that the at least one light guide may be positioned at a different angle or at different angles with respect to the at least one LED filament.

In an embodiment, the angle between the first elongation axis and the second elongation axis is in the range from 10 to 30 degrees. The obtained effect is that the light emitting device produces less glare. The reason is that the first spatial light distribution and the second spatial light distribution may be different. For example, the first spatial light distribution and the second spatial light distribution may not fully overlap. The obtained effect is also improved decorative lighting. The reason is that the at least one light guide may be positioned at a different angle or at different angles with respect to the at least one LED filament.

At least part of the light emitted by the plurality of light sources is coupled into the at least one light guide. The obtained effect is that the light emitting device produces less glare. The reason is that the at least one light guide guides the light which is coupled into the at least one light guide at the at least one light in-coupling portion via total internal reflection to the plurality of light out-coupling portions. The at least one light guide increases the light emitting surface in the lamp and thus decreases the brightness of the at least one LED-filament. Decreased brightness of the at least one LED-filament causes less glare.

In an embodiment, the at least one light guide is mechanically and optically coupled to the at least one LED-filament. The obtained effect is that the light emitting device produces less glare. The reason is that the light in-coupling of the light emitted by the plurality of light sources into the at least one light guide is improved. Thus the amount of light emitted by the at least one LED-filament is reduced. The obtained effect is also improved decorative lighting. The reason is that the combination of the at least one light guide and the at least one LED filament has the look of a single filament of an incandescent bulb. The obtained effect is also improved mechanical stability of the at least one light guide. The reason is that the at least one light guide is also mechanically supported by the LED-filament.

In an embodiment, the lighting device comprises at least one further light source. At least part of the light emitted by the at least one further light source is coupled into the at least one light guide. The obtained effect is that the light emitting device produces less glare. The reason is that the at least one light guide increases the light emitting surface in the lamp and thus decreases the brightness of the at least one LED-filament. In an embodiment the at least one further source is a solid state light source such as for example a light emitting diode (LED) or a laser diode. The at least one further light source may be arranged on a further light source carrier. The at least one further light source may be in mechanical contact with the base. The further light source carrier may be in mechanical contact with the base.

In an embodiment, the average intensity of the at least one light guide is in the range from 0.5 times the average intensity of the at least one LED-filament and 2 times the average intensity of the at least one LED-filament. More preferably, the average intensity of the at least one light guide is in the range from 0.7 times the average intensity of the at least one LED-filament and 1.4 times the average intensity of the at least one LED-filament. Most preferably, the average intensity of the at least one light guide is in the range from 0.8 times the average intensity of the at least one LED-filament and 1.2 times the average intensity of the at least one LED-filament. The obtained effect is that the light emitting device produces less glare. The reason is that under these conditions the brightness of the at least one LED-filament is further decreased. The obtained effect is that it much better mimics the look, i.e. aesthetics, of an incandescent bulb. The reason is that under these conditions the intensity of the at least one LED-filament and the intensity of the at least one light guide is almost the same.

In an embodiment, the at least one light guide is positioned along the longitudinal axis and the at least one LED-filament is positioned at non-zero distance to the at least one light guide. The obtained effect is improved homogeneous light spatial light distribution. The reason is that the at least one light guide is positioned in the optical center of the light emitting device.

In an embodiment, the average diameter of the at least one light guide is in range from 0.5 times the average diameter of the at least one LED-filament and 2 times the average diameter of the at least one LED-filament. More preferably, the average diameter of the at least one light guide is in range from 0.7 times the average diameter of the at least one LED-filament and 1.4 times the average diameter of the at least one LED-filament. Most preferably, the average diameter of the at least one light guide is in range from 0.8 times the average diameter of the at least one LED-filament and 1.2 times the average diameter of the at least one LED-filament. The obtained effect is that it much better mimics the look, i.e. aesthetics, of an incandescent bulb. The reason is that the at least one light guide and the at least one LED-filament have the same dimensions. In an embodiment the width of the LED-filament is preferably in the range from 0.5 to 5 mm, more preferably in the range from 0.8 to 4 mm, most preferably in the range from 1 to 3 mm.

In an embodiment, the total length of the at least one light guide is at least 2 times the total length of the at least one at least one LED-filament. More preferably, the total length of the at least one light guide is at least 4 times the total length of the at least one at least one LED-filament. More preferably, the total length of the at least one light guide is at least 5 times the total length of the at least one at least one LED-filament. The obtained effect is that the light emitting device produces less glare. The reason is that the at least one light guide further increases the light emitting surface in the lamp and thus decreases the brightness of the at least one LED-filament. In an embodiment the length of the LED-filament is preferably in the range from 1 to 10 cm, more preferably in the range from 2 to 8 cm, most preferably in the range from 3 to 6 cm.

In an embodiment, at least a first portion of the at least one light guide is mechanically and optically coupled to a first portion of at least one LED-filament, and at least a second portion of the at least one light guide is mechanically and optically coupled to a second portion of the at least one LED-filament. The obtained effect is that the light emitting device produces less glare. The reason is that more light emitted by the plurality of light sources is coupled into the at least one light guide.

In an embodiment, at least a first portion of the at least one light guide is mechanically and optically coupled to the a first portion of the at least one LED-filament, at least a second portion of the at least one light guide is mechanically and optically coupled to the a second portion of the at least one LED-filament, and at least a third portion of the at least one light guide is mechanically and optically coupled to the a third portion of the at least one LED-filament. The obtained effect is less glare. The reason is that more light emitted by the plurality of light sources is coupled into the at least one light guide.

In an embodiment, at least a first portion of the at least one light guide is mechanically and optically coupled to the a first portion of the at least one LED-filament, at least a second portion of the at least one light guide is mechanically and optically coupled to the a second portion of the at least one LED-filament, at least a third portion of the at least one light guide is mechanically and optically coupled to the a third portion of the at least one LED-filament, at least a fourth portion of the at least one light guide is mechanically and optically coupled to the a fourth portion of the at least one LED-filament. The obtained effect is that the light emitting device produces less glare. The reason is that more light emitted by the plurality of light sources is coupled into the at least one light guide.

In an embodiment, the at least one light guide is mechanically and optically coupled to at least one LED-filament at more than four locations such as, for example, five, six, seven, eight, nine, ten, eleven or twelve locations. The obtained effect is that the light emitting device produces less glare. The reason is that more light emitted by the plurality of light sources is coupled into the at least one light guide.

In an embodiment, at least a part of the at least one light guide is wrapped around the at least one LED-filaments. The obtained effect is that the light emitting device produces less glare. The reason is that more light emitted by the plurality of light sources is coupled into the at least one light guide.

In an embodiment, the lighting device comprises a control unit which is electrically connected to the plurality of light sources and the at least one further light source. The controller separately controls the amount of light emitted from the plurality of light sources and the at least one further light source. The obtained effect is that that the lighting device may produce a larger variety of colors, color temperatures and intensities. The reason is that by the plurality of light sources and the at least one further light source can be controlled separately.

The present invention discloses a luminaire in accordance with the independent claim 15.

In an embodiment, a luminaire comprises said lighting device.

BRIEF DESCRIPTION OF THE DRAWINGS

Embodiments of the invention will now be described, by way of example only, with reference to the accompanying schematic drawings in which corresponding reference symbols indicate corresponding parts, and in which:

FIGS. 9a-9d schematically depict a more detailed view of the LED-filament and light guide in a Z direction according to another embodiment of the present invention;

The schematic drawings are not necessarily on scale.

The same features having the same function in different figures are referred to the same references.

DETAILED DESCRIPTION OF THE EMBODIMENTS

Figure 1:
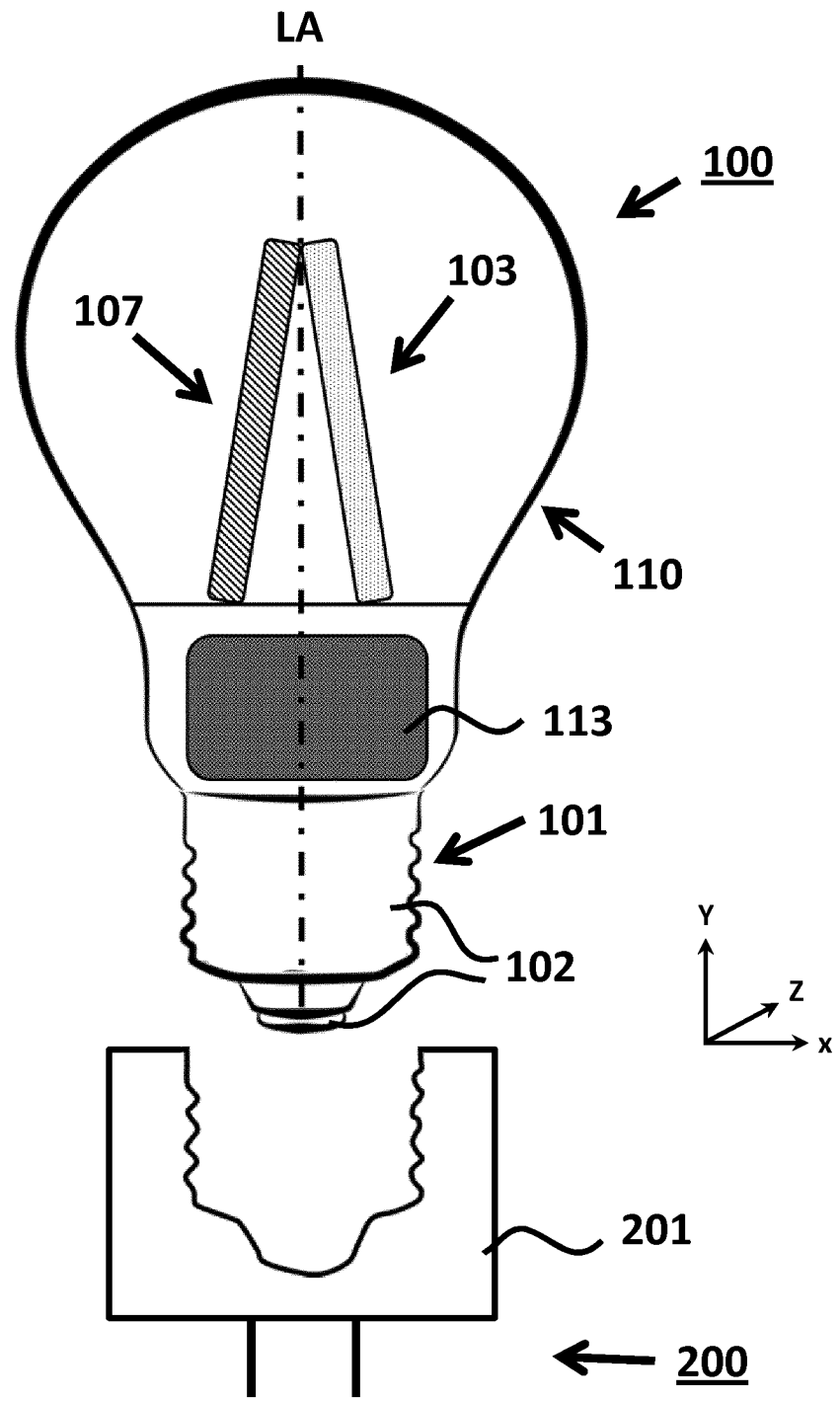
FIG. 1 schematically depicts a cross-section of the lighting device in a XY plane according to an embodiment of the present invention.

FIG. 1 schematically depicts a cross-section of the lighting device in a XY plane according to an embodiment of the present invention. As depicted in FIG. 1, the lighting device 100 comprises a base 101, at least one LED-filament 103, at least one light guide 107, and an at least in part light-transmissive envelope 110. The base 101 has a longitudinal axis LA and comprises an electrical connector 102 to connect the lighting device 100 to a luminaire socket 201 of a luminaire 200. The at least in part light-transmissive envelope 110 at least partly encapsulate said at least one LED-filament 103 and said at least one light guide 107. The at least one LED-filament 103 is external to the at least one light guide 107.

As depicted in FIG. 1, the luminaire may comprise said lighting device 100.

As depicted in FIG. 1, the lighting device 100 further comprises a driver circuit 113 which is electrically connected between the electrical connector 102 and the plurality of light sources 105.

Figure 2A:
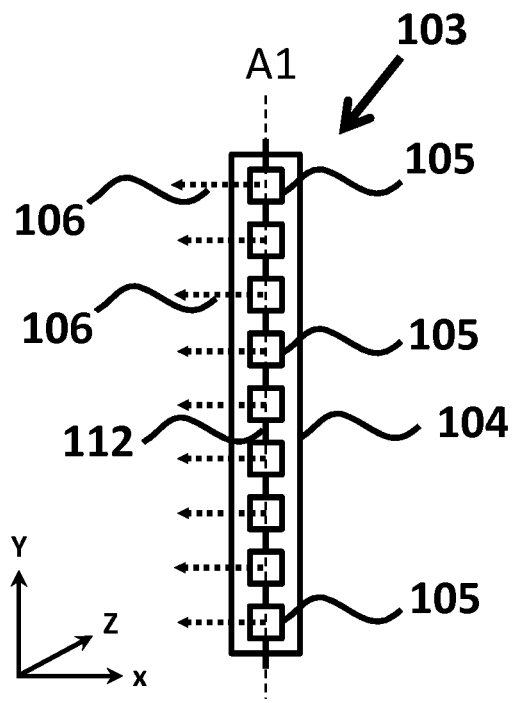
FIGS. 2a-2c schematically depict a more detailed view of the LED-filament of the lighting device of FIG. 1 in a Z direction (FIG. 2a), in a Y direction (FIG. 2b), and in a X direction (FIG. 2c) according to another embodiment of the present invention.
Figure 2B:
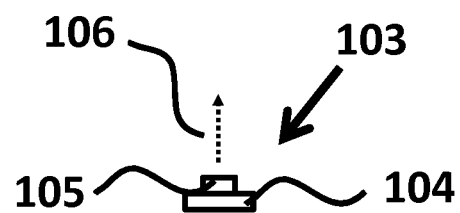
Figure 2C:
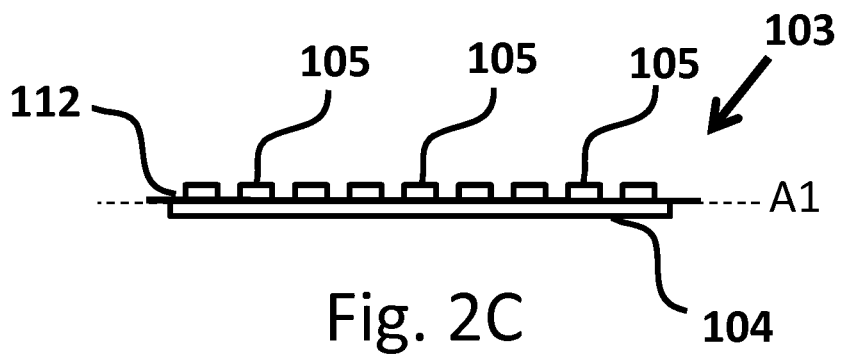

FIGS. 2a-2c schematically depict a more detailed view of the LED-filament of the lighting device of FIG. 1 in a Z direction (FIG. 2a), in a Y direction (FIG. 2b), and in a X direction (FIG. 2c) according to another embodiment of the present invention. As depicted in FIGS. 2a-2c, the LED-filament 103 comprises a substrate 104 which has an elongated body and a plurality of light sources 105 which are mechanically coupled to the substrate 104. The plurality of light sources 105 emits light 106 in a first spatial light distribution. The plurality of light sources 105 may be electrically connected by an electrical connector 112.

Figures 3A, 3B:
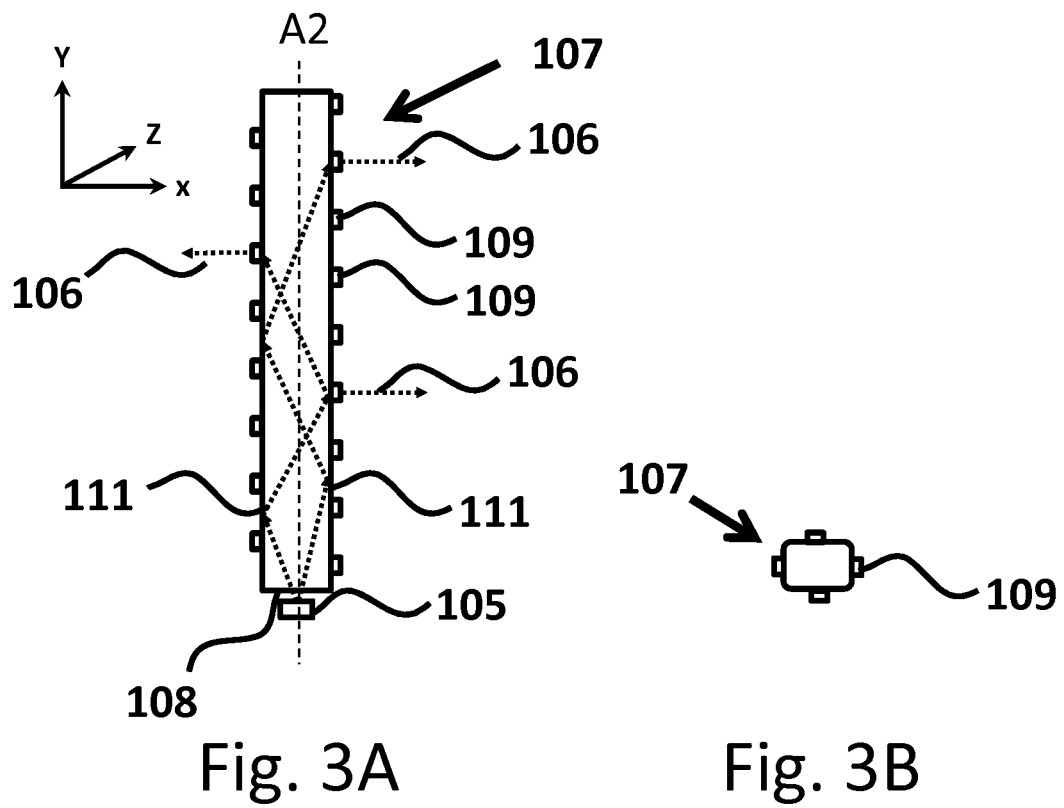
FIGS. 3a-3c schematically depict a more detailed view of the light guide of the lighting device of FIG. 1 in a Z direction (FIG. 3a), in a Y direction (FIG. 3b), and in a X direction (FIG. 3c) according to another embodiment of the present invention.
Figure 3C:
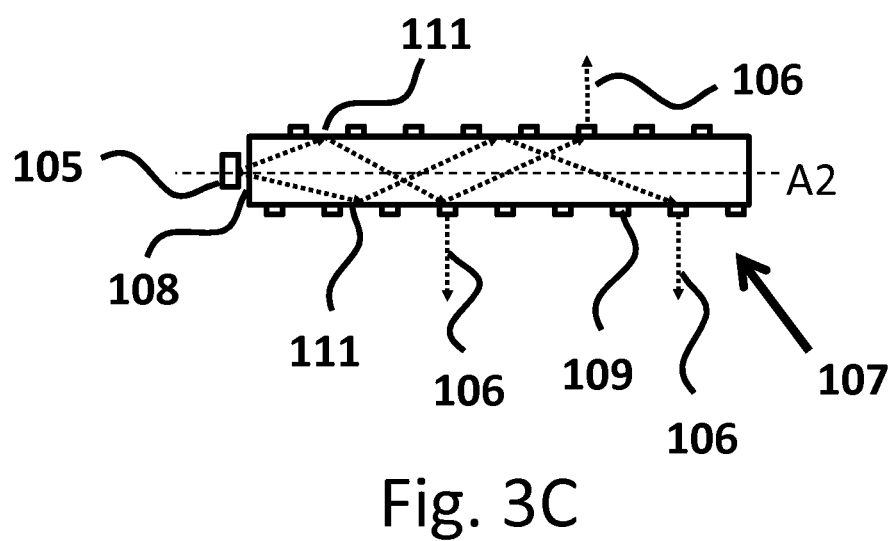

FIGS. 3a-3c schematically depict a more detailed view of the light guide of the lighting device of FIG. 1 in a Z direction (FIG. 3a), in a Y direction (FIG. 3b), and in a X direction (FIG. 3c) according to another embodiment of the present invention. As depicted in FIGS. 3a-3c, the at least one light guide 107 has an elongated body and comprises at least one light in-coupling portion 108 at at least on the external periphery of the at least one light guide 107 to couple light 106 into the at least one light guide 107. The at least one light guide 107 comprises a plurality of light out-coupling portions 109 to couple light 106 out of the at least one light guide 107 in a second spatial light distribution. The at least one light guide 107 is arranged for guiding the light 106 which is coupled into the at least one light guide 107 at the at least one light in-coupling portion 108 via total internal reflection 111 to the plurality of light out-coupling portions 109.

Figures 4A, 4B:
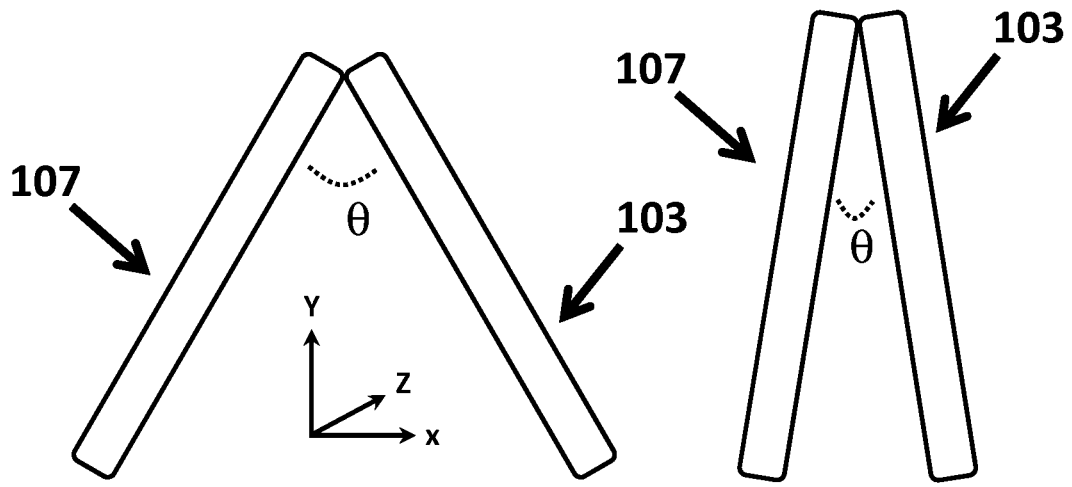
FIGS. 4a-4b schematically depict a cross-section of the LED-filament and light guide in a XY plane according to another embodiment of the present invention.

FIGS. 4a-4b schematically depict a cross-section of the LED-filament 103 and light guide 107 in a XY plane according to another embodiment of the present invention. As depicted in FIG. 4A, the substrate 103 has an elongated body has an extension along a first elongation axis A1 and the at least one light guide 107 has an elongated body which has an extension along a second elongation axis A2. At least a portion of the first elongation axis A1 is non-parallel to at least a portion of the second elongation axis A2.

As depicted in FIG. 4A, the angle θ between the first elongation axis A1 and the second elongation axis A2 is in the range from 10 to 80 degrees.

As depicted in FIG. 4B, the angle θ between the first elongation axis A1 and the second elongation axis A2 is in the range from 10 to 30 degrees.

Figure 5:
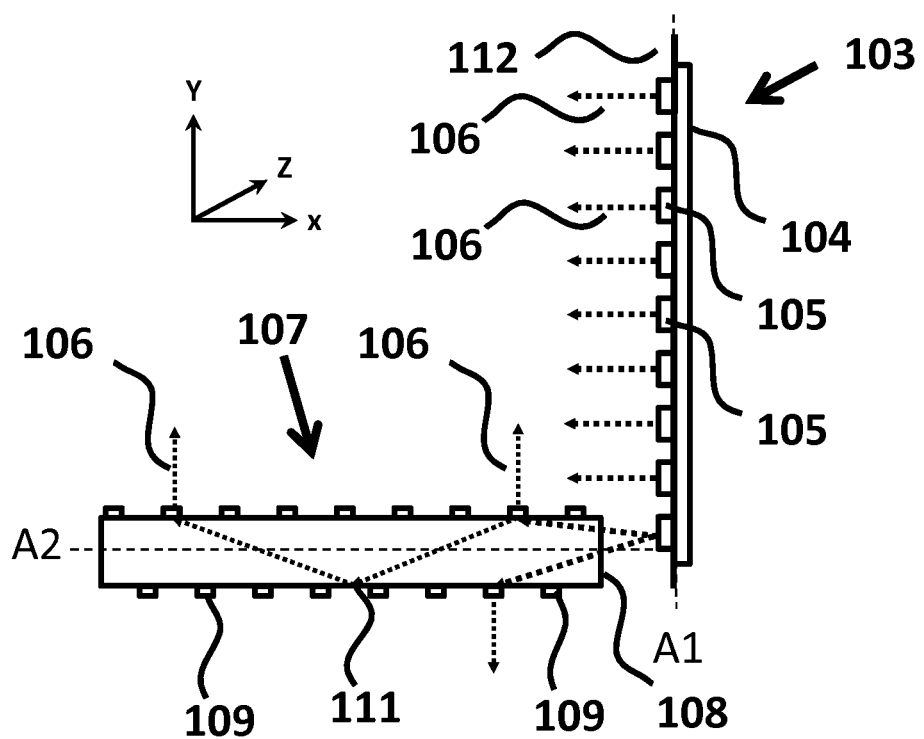
FIG. 5 schematically depicts a more detailed cross-section of the LED-filament and light guide in a XY plane according to another embodiment of the present invention.

FIG. 5 schematically depicts a more detailed cross-section of the LED-filament 103 and light guide 107 in a XY plane according to another embodiment of the present invention. As depicted in FIG. 5, at least part of the light 106 emitted by the plurality of light sources 105 is coupled into the at least one light guide 107.

Figure 6A:
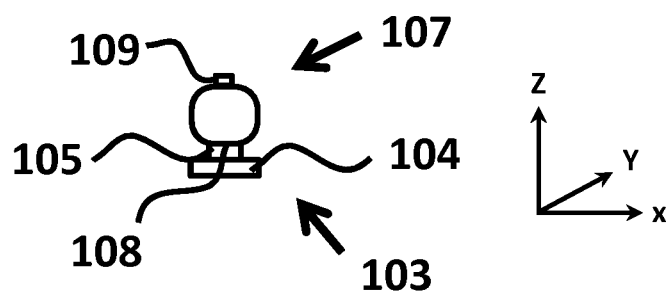
FIGS. 6a-6c schematically depict a more detailed cross-section of the LED-filament and light guide in a XZ plane according to another embodiment of the present invention.
Figures 6B, 6C:
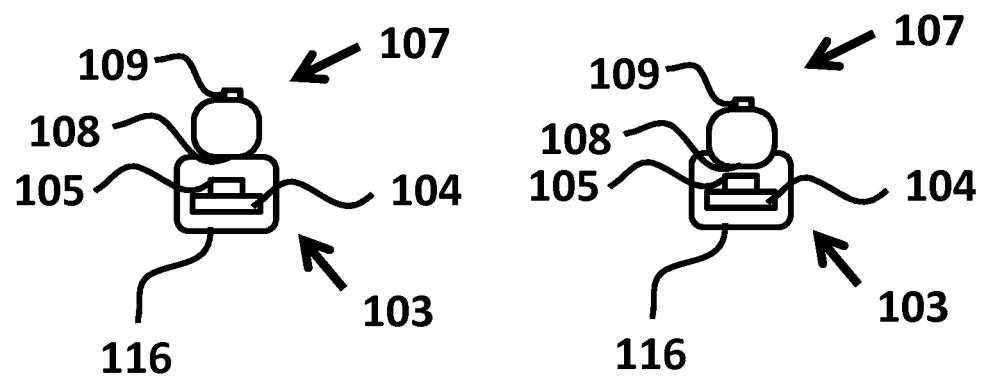

FIGS. 6a-6c schematically depict a more detailed cross-section of the LED-filament 103 and light guide 107 in a XZ plane according to another embodiment of the present invention. As depicted in FIG. 6A, the at least one light guide 107 is mechanically and optically coupled to the at least one LED-filament 103.

As depicted in FIG. 6B, the at least one light guide 107 is mechanically and optically coupled to the at least one LED-filament 103. The LED-filament may be encapsulated by an encapsulant 116 such as, for example, a polymer material. For example, the polymer material may be a silicone. The obtained effect is improved optical coupling. The reason is that the silicone improved the mechanical and optical coupling of the LED-filament 103 to the light guide 107. The encapsulant 116 may comprise a luminescent material such as an inorganic phosphor, an organic phosphor or quantum dots or rods. The luminescent material may for example be dispersed in the encapsulant 116.

As depicted in FIG. 6C, the at least one light guide 107 is mechanically and optically coupled to the at least one LED-filament 103. The light guide may, for example, be partly surrounded by the encapsulant 116.

Figure 7A:
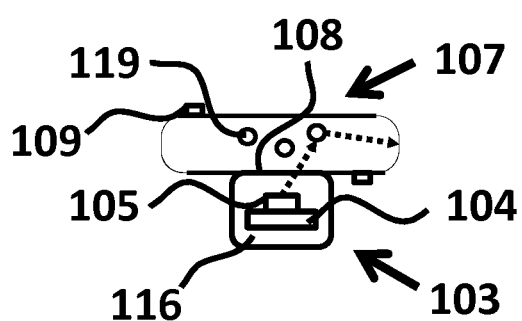
FIGS. 7a-7d schematically depict a more detailed cross-section of the LED-filament and light guide in a XZ plane according to another embodiment of the present invention.

FIGS. 7a-7d schematically depict a more detailed cross-section of the LED-filament 103 and light guide 107 in a XZ plane according to another embodiment of the present invention. As depicted in FIG. 7A, the light guide 107 may comprise a scattering material 119, such as for example TiO2, BaSO4 and/or Al2O3 particles or air bubbles. The obtained effect is improved in-coupling of the light 106 into the light guide 107. The reason is that light 106 is redirected by the scattering material 119 such that light 106 is coupled into the light guide 107.

Figure 7B:
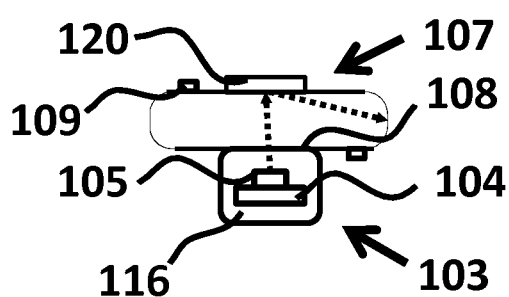

As depicted in FIG. 7B, the light guide 107 may comprise a reflector 120, such as for example a diffuse reflective material such as for example a material based on TiO2, BaSO4 and/or Al2O3 particles. The obtained effect is improved in-coupling of the light 106 into the light guide 107. The reason is that light 106 is redirected by the reflector 120 such that light 106 is coupled into the light guide 107.

Figure 7C:
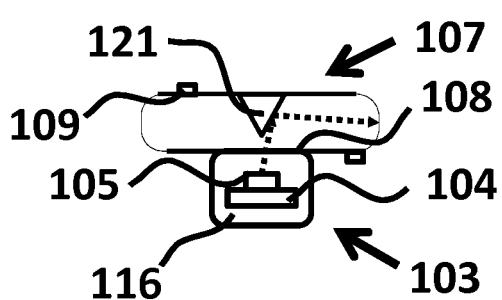

As depicted in FIG. 7C, the light guide 107 may comprise a refractive structure 121. The obtained effect is improved in-coupling of the light 106 into the light guide 107. The reason is that light 106 is redirected by the refractive structure 121 such that light 106 is coupled into the light guide 107.

Figure 7D:
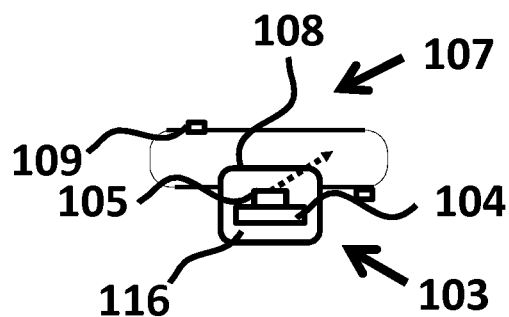

As depicted in FIG. 7D, the light guide 107 encapsulant 116 may be partly surrounded by the light guide comprise a refractive structure 121. The obtained effect is improved in-coupling of the light 106 into the light guide 107. The reason is that light 106 is redirected by the refractive structure 121 such that light 106 is coupled into the light guide 107.

FIGS. 7a-7d schematically depict a more detailed cross-section of the LED-filament 103 and light guide 107 which are mechanically and optically coupled. The LED-filament 103 and light guide 107 may also positioned at a distance different from zero from each other.

Figure 8:
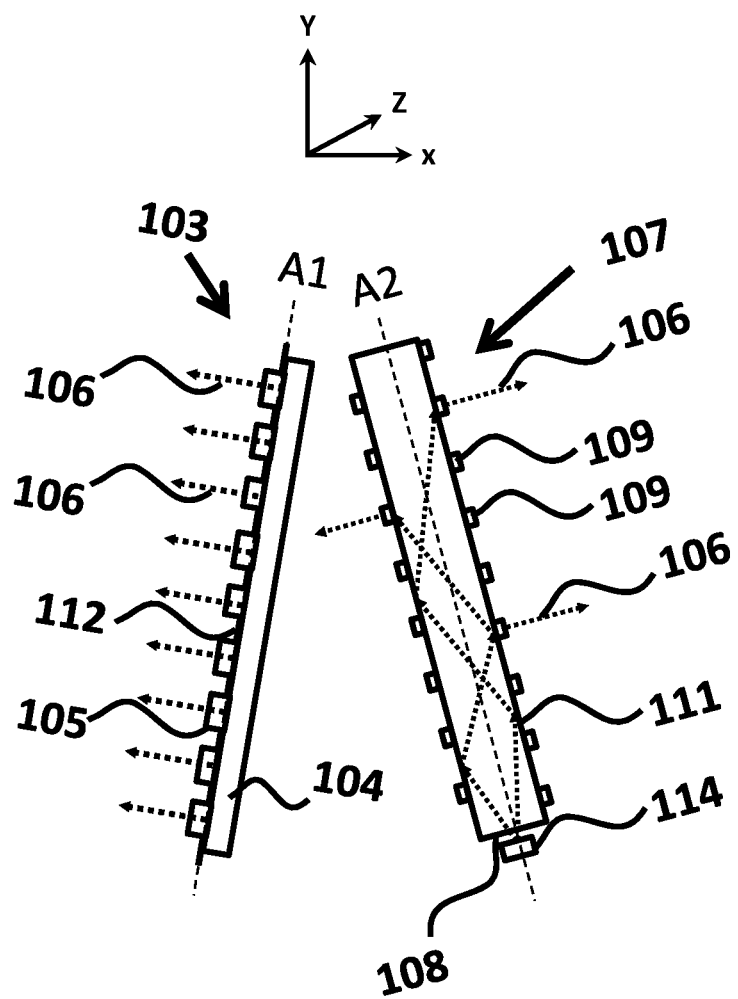
FIG. 8 schematically depicts a more detailed cross-section of the LED-filament and light guide in a XY plane according to another embodiment of the present invention.

FIG. 8 schematically depicts a more detailed cross-section of the LED-filament 103 and light guide 107 in a XY plane according to another embodiment of the present invention. The lighting device 100 comprises at least one further light source 114. At least part of the light 106 emitted by the at least one further light source 114 is coupled into the at least one light guide 107. The at least one further light source may be arranged on a further light source carrier.

FIGS. 9a-9d schematically depict a more detailed view of the LED-filament 103 and light guide 107 in a Z direction according to another embodiment of the present invention. As depicted in FIG. 9a, the light guide 107 has a first portion and a second portion. The LED-filament 103 has a first portion and a second portion. The first portion of the light guide 107 is wrapped around the first portion of the LED-filament 103. The second portion of the light guide 107 is not wrapped around the LED-filament 103 and provides a decorative light emitting loop.

As depicted in FIG. 9b, the light guide 107 has a first portion and a second portion. The first LED-filament 103' has a first portion and a second portion. The second LED-filament 103" has a first portion and a second portion. The first portion of the light guide 107 is wrapped around the first portion of the first LED-filament 103. The second portion of the light guide 107 is wrapped around the first portion of the second LED-filament 103". The light guide 107 provides a decorative light emitting connection between the first LED-filament 103' and the second LED-filament 103".

As depicted in FIG. 9c, the light guide 107 is wrapped around a first LED-filament 103' and a second LED-filament 103". The light guide 107 provides a decorative light emitting connections between the first LED-filament 103' and the second LED-filament 103". Such configuration provides a decorative lighting effect integrating both types of filaments.

As depicted in FIG. 9d, the light guide 107 is wrapped around a first LED-filament 103' and a second LED-filament 103". The first LED-filament 103' is non-parallel to the second LED-filament 103". The light guide 107 provides a decorative light emitting connections between the first LED-filament 103' and the second LED-filament 103". Such configuration provides a decorative lighting effect integrating both types of filaments. In an embodiment multiple LED-filaments 103 may be combined with multiple light guides 107. For example, two LED-filaments 103 may be combined with two light guides 107. For example, two times the configuration shown in FIG. 9A may be used.

In an embodiment, at least a first portion of the at least one light guide 107 is mechanically and optically coupled to the a first portion of the at least one LED-filament 103, and at least a second portion of the at least one light guide 107 is mechanically and optically coupled to the a second portion of the at least one LED-filament 103.

In an embodiment, the average intensity of the at least one light guide 107 is in the range from 0.5 times the average intensity of the at least one LED-filament 103 and 2 times the average intensity of the at least one LED-filament 103. In this way the light guides 107 and the LED filaments 103 have about the same appearance.

Figure 10:
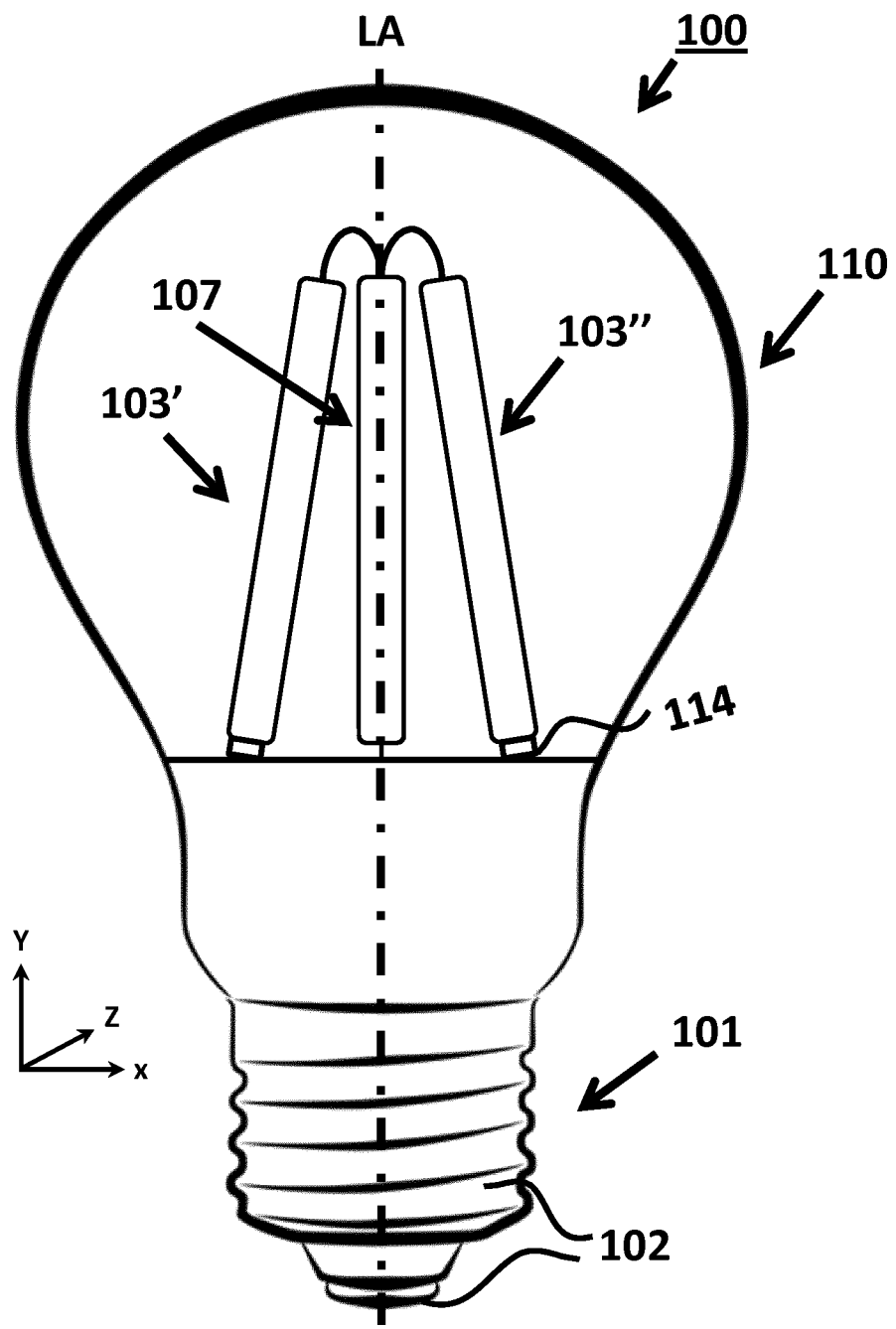
FIG. 10 schematically depicts a view of the lighting device in a Z direction according to an embodiment of the present invention.

FIG. 10 schematically depicts a view of the lighting device 100 in a Z direction according to an embodiment of the present invention. The lighting device comprise a first LED-filament 103', a second LED-filament 103" and a light guide 107. The light guide 107 is positioned along the longitudinal axis LA and the first LED filament 103' and the second LED-filament 103" are positioned at non-zero distance to the light guide 107.

In an embodiment, the average diameter of the at least one light guide 107 is in range from 0.5 times the average diameter of the at least one LED-filament 103 and 2 times the average diameter of the at least one LED-filament 103. In this way the light guides 107 and the LED filaments 103 have about the same appearance.

In an embodiment, the total length of the at least one light guide 107 is at least 2 times the total length of the at least one at least one LED-filament 103.

Figure 11:
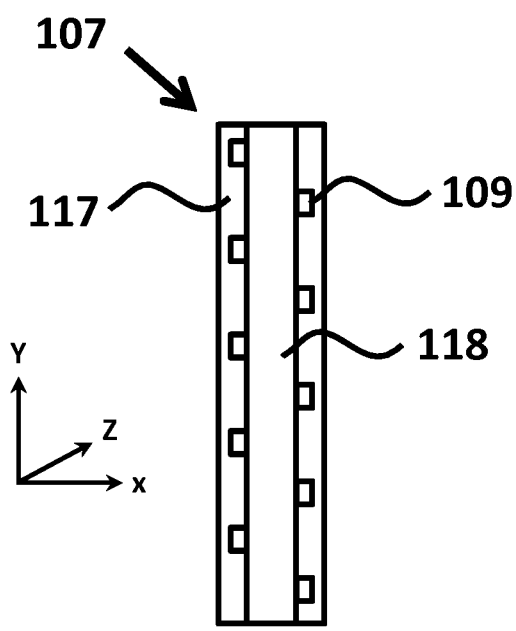
FIG. 11 schematically depicts a cross-section of the light guide in a XY plane according to an embodiment of the present invention.

FIG. 11 schematically depicts a cross-section of the light guide 107 in a XY plane according to an embodiment of the present invention. The light guide 107 comprises a core 118 and a cladding 117. The cladding 117 is at least partly surrounding the core 118. The cladding 118 has a lower refractive index than the core 117. Light 106 is kept in the core 117 by the phenomenon of total internal reflection 111 which causes the light guide to act as a waveguide. The obtained effect is that light 106 can be guided along the length of the fiber and coupled out of the light guide 107 by the plurality of light out-coupling portions 109.

Figure 12:
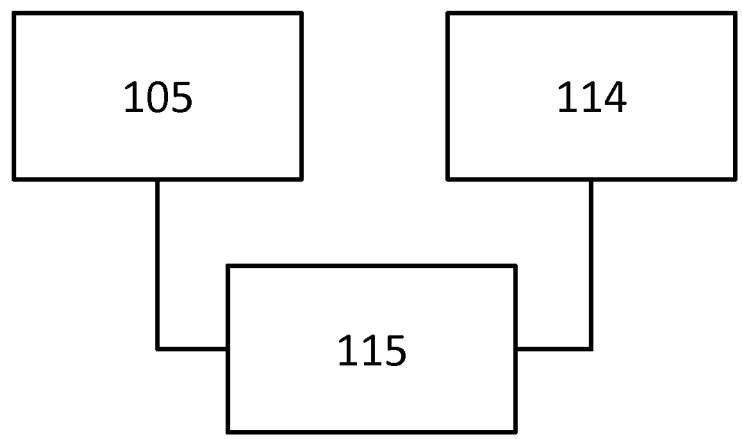
FIG. 12 schematically depicts a block chart of the lighting device according to another embodiment of the present invention.

FIG. 12 schematically depicts a block chart of the lighting device 100 according to another embodiment of the present invention. the lighting device 100 comprises a control unit 115 electrically connected to the plurality of light sources 105 and at least one further light source 114 to separately control the amount of light 108 which is emitted from the plurality of light sources 105 and at least one further light source 114. In an embodiment, the control unit 115 may control the amount of light 108 which is emitted from the plurality of light sources 105 and at least one further light source 114 based on input received from a user interface, a clock module and/or a sensor. The user interface may be, for example, a touch-display. The sensor may be, for example, a light sensor and/or a presence sensor. For example, dependent on the amount of ambient light, the control unit 115 may separately control the amount of light 108 which is emitted from the plurality of light sources 105 and at least one further light source 114. For example, if the sensor measures a low ambient light level the control unit 115 separately control the amount of light 108 which is emitted from the plurality of light sources 105 and at least one further light source 114 such that the at least one further light source 114 emits relatively more light than the plurality of light sources 105.

The plurality of light sources 105 and/or at least one further light source 114 selected from the group consisting of phosphor converted light emitting diodes, direct emitting light emitting diodes, phosphor converted laser diodes, and direct emitting laser diodes.

The lighting device 100 may be configured to provide white light. The term white light herein, is known to the person skilled in the art and relates to white light having a correlated color temperature (CCT) between about 2.000 K and 20.000 K. In an embodiment the CCT is between 2.500 K and 10.000K. Usually, for general lighting, the CCT is in the range of about 2700K to 6500K. Preferably, it relates to white light having a color point within about 15, 10 or 5 SDCM (standard deviation of color matching) from the BBL (black body locus). Preferably, it relates to white light having a color rendering index (CRI) of at least 70 to 75, for general lighting at least 80 to 85.

The term "substantially" herein, such as in "substantially all light" or in "substantially consists", will be understood by the person skilled in the art. The term "substantially" may also include embodiments with "entirely", "completely", "all", etc. Hence, in embodiments the adjective substantially may also be removed. Where applicable, the term "substantially" may also relate to 90% or higher, such as 95% or higher, especially 99% or higher, even more especially 99.5% or higher, including 100%. The term "comprise" includes also embodiments wherein the term "comprises" means "consists of". The term "and/or" especially relates to one or more of the items mentioned before and after "and/or". For instance, a phrase "item 1 and/or item 2" and similar phrases may relate to one or more of item 1 and item 2. The term "comprising" may in an embodiment refer to "consisting of" but may in another embodiment also refer to "containing at least the defined species and optionally one or more other species".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices herein are amongst others described during operation. As will be clear to the person skilled in the art, the invention is not limited to methods of operation or devices in operation.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention further applies to a device comprising one or more of the characterizing features described in the description and/or shown in the attached drawings. The invention further pertains to a method or process comprising one or more of the characterizing features described in the description and/or shown in the attached drawings.

The various aspects discussed in this patent can be combined in order to provide additional advantages. Further, the person skilled in the art will understand that embodiments can be combined, and that also more than two embodiments can be combined. Furthermore, some of the features can form the basis for one or more divisional applications.

The invention claimed is:

1. A lighting device for use in a luminaire comprising:
   a base having a longitudinal axis (LA) and comprising an electrical connector for connecting the lighting device to a luminaire socket of the luminaire,
   at least one LED-filament comprising a substrate having an elongated body and a plurality of light sources mechanically coupled to the substrate, the plurality of light sources configured for emitting light in a first spatial light distribution,
   at least one light guide having an elongated body, comprising at least one light in-coupling portion at least on the external periphery of the at least one light guide for coupling light into the at least one light guide, a plurality of light out-coupling portions for coupling light out of the at least one light guide in a second spatial light distribution,
   an at least in part light-transmissive envelope at least partly encapsulating said at least one LED-filament and said at least one light guide,
   wherein the at least one light guide is arranged for guiding the light coupled into the at least one light guide at the at least one light in-coupling portion via total internal reflection to the plurality of light out-coupling portions,
   wherein the at least one LED-filament is external to the at least one light guide
   wherein at least part of the light emitted by the plurality of light sources is coupled into the at least one light guide, and
   wherein the lighting device comprises at least one further light source, wherein at least part of the light emitted by the at least one further light source is coupled into the at least one light guide, wherein respective light emitted by the plurality of light sources and the at least one further light source are separately controlled.

2. A lighting device according to claim 1, further comprising a driver circuit being electrically connected between the electrical connector and the plurality of light sources.

3. A lighting device according to claim 1, wherein the substrate having an elongated body having an extension along a first elongation axis (A1) and the at least one light guide having an elongated body having an extension along a second elongation axis (A2), wherein at least a portion of the first elongation axis (A1) is non-parallel to at least a portion of the second elongation axis (A2).

4. A lighting device according to claim 1, wherein the angle θ between the first elongation axis (A1) and the second elongation axis (A2) is in the range from 10 to 80 degrees.

5. A lighting device according to claim 1, wherein the angle θ between the first elongation axis (A1) and the second elongation axis (A2) is in the range from 10 to 30 degrees.

6. A lighting device according to claim 1, wherein the at least one light guide is mechanically and optically coupled to the at least one LED-filament.

7. A lighting device according to claim 1, wherein at least a part of the at least one light guide is wrapped around the at least one LED-filament.

8. A lighting device according to claim 7, wherein the lighting is guide is further wrapped around a second LED-filament.

9. A lighting device according to claim 1, wherein the average intensity of the at least one light guide is in the range from 0.5 times the average intensity of the at least one LED-filament and 2 times the average intensity of the at least one LED-filament.

10. A lighting device according to claim 1, wherein the at least one light guide is positioned along the longitudinal axis (LA) and the at least one LED-filament is positioned at non-zero distance to the at least one light guide.

11. A lighting device for use in a luminaire comprising:
    a base having a longitudinal axis (LA) and comprising an electrical connector for connecting the lighting device to a luminaire socket of the luminaire,
    at least one LED-filament comprising a substrate having an elongated body and a plurality of light sources mechanically coupled to the substrate, the plurality of light sources configured for emitting light in a first spatial light distribution,
    at least one light guide having an elongated body, comprising at least one light in-coupling portion at least on the external periphery of the at least one light guide for coupling light into the at least one light guide, a plurality of light out-coupling portions for coupling light out of the at least one light guide in a second spatial light distribution,
    an at least in part light-transmissive envelope at least partly encapsulating said at least one LED-filament and said at least one light guide,
    wherein the at least one light guide is arranged for guiding the light coupled into the at least one light guide at the at least one light in-coupling portion via total internal reflection to the plurality of light out-coupling portions, wherein the at least one LED-filament is external to the at least one light guide
wherein at least part of the light emitted by the plurality of light sources is coupled into the at least one light guide,
wherein the average diameter of the at least one light guide is in range from 0.5 times the average diameter of the at least one LED-filament and 2 times the average diameter of the at least one LED-filament.

12. A lighting device for use in a luminaire comprising:
a base having a longitudinal axis (LA) and comprising an electrical connector for connecting the lighting device to a luminaire socket of the luminaire,
at least one LED-filament comprising a substrate having an elongated body and a plurality of light sources mechanically coupled to the substrate, the plurality of light sources configured for emitting light in a first spatial light distribution,
at least one light guide having an elongated body, comprising at least one light in-coupling portion at least on the external periphery of the at least one light guide for coupling light into the at least one light guide, a plurality of light out-coupling portions for coupling light out of the at least one light guide in a second spatial light distribution,
an at least in part light-transmissive envelope at least partly encapsulating said at least one LED-filament and said at least one light guide,
wherein the at least one light guide is arranged for guiding the light coupled into the at least one light guide at the at least one light in-coupling portion via total internal reflection to the plurality of light out-coupling portions,
wherein the at least one LED-filament is external to the at least one light guide
wherein at least part of the light emitted by the plurality of light sources is coupled into the at least one light guide,
wherein the total length of the at least one light guide is at least 2 times the total length of the at least one at least one LED-filament.

13. A lighting device according to claim 1, wherein at least a first portion of the at least one light guide is mechanically and optically coupled to the a first portion of the at least one LED-filament, and at least a second portion of the at least one light guide is mechanically and optically coupled to the a second portion of the at least one LED-filament.

14. A lighting device according to claim 1, wherein the lighting device comprises a control unit electrically connected to the plurality of light sources and at least one further light source for separately controlling the amount of light emitted from the plurality of light sources and at least one further light source.

15. A luminaire comprising said lighting device according to claim 1.

16. A lighting device for use in a luminaire comprising:
a base having a longitudinal axis (LA) and comprising an electrical connector for connecting the lighting device to a luminaire socket of the luminaire,
at least one LED-filament comprising a substrate having an elongated body and a plurality of light sources mechanically coupled to the substrate, the plurality of light sources configured for emitting light in a first spatial light distribution,
at least one light guide having an elongated body, comprising at least one light in-coupling portion at least on the external periphery of the at least one light guide for coupling light into the at least one light guide, a plurality of light out-coupling portions for coupling light out of the at least one light guide in a second spatial light distribution,
an at least in part light-transmissive envelope at least partly encapsulating said at least one LED-filament and said at least one light guide,
wherein the at least one light guide is arranged for guiding the light coupled into the at least one light guide at the at least one light in-coupling portion via total internal reflection to the plurality of light out-coupling portions,
wherein the at least one LED-filament is external to the at least one light guide
wherein at least part of the light emitted by the plurality of light sources is coupled into the at least one light guide, and
wherein the lighting device comprises at least one further light source, wherein at least part of the light emitted by the at least one further light source is coupled into the at least one light guide, and wherein the at least one further light source is in mechanical contact with the base.

* * * * *